July 18, 1961  J. S. COURTNEY-PRATT  2,992,591
HIGH SPEED CINECAMERA
Filed July 15, 1957  4 Sheets-Sheet 1
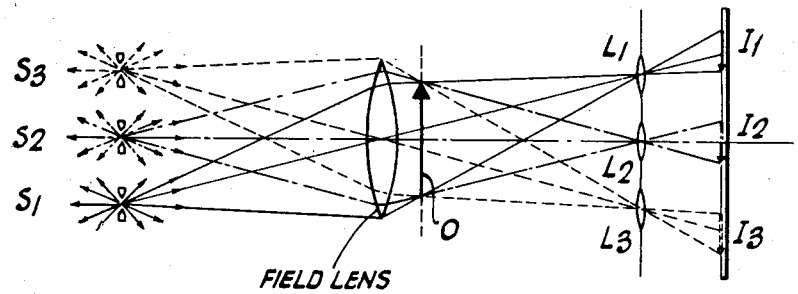
FIG.I.   PRIOR ART
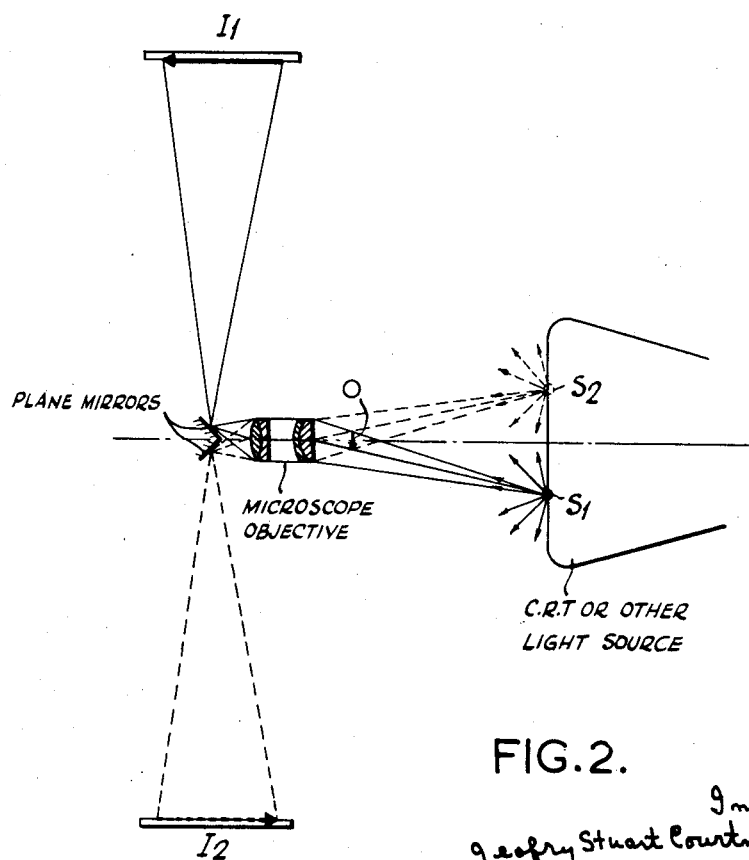
FIG.2.

July 18, 1961  J. S. COURTNEY-PRATT  2,992,591
HIGH SPEED CINECAMERA
Filed July 15, 1957  4 Sheets-Sheet 2

July 18, 1961  J. S. COURTNEY-PRATT  2,992,591
HIGH SPEED CINECAMERA
Filed July 15, 1957  4 Sheets-Sheet 3

United States Patent Office 2,992,591
Patented July 18, 1961

2,992,591
HIGH SPEED CINECAMERA
Jeofry Stuart Courtney-Pratt, Cambridge, England, assignor to National Research Development Corporation, London, England, a British corporation
Filed July 15, 1957, Ser. No. 671,951
Claims priority, application Great Britain July 20, 1956
1 Claim. (Cl. 88—16)

This invention relates to high speed cinematography.

In normal cinematograph techniques a moving object is illuminated by a diffuse light source and an image is formed by the optical system of the camera in a constant position. Successive exposures are made by periodically obscuring and permitting passage of rays, between the light source and the image position by a revolving shutter or the like and are photographed on different parts of a sensitised film by moving the film during the intervals when the light source is obscured by the shutter. The speed of film movement and shutter operation are limited and for cinematography of an object moving at great speed (e.g. a bullet) the number of exposures required per unit time exceeds the capabilities of these normal techniques.

It has previously been proposed to overcome these difficulties, where only a short run of film is required, by illuminating the field in which the photographed object moves from a number of light sources located in separated positions and energised in succession, a field lens being placed between the light sources and the path of the object so that the rays from each light source pass through a different "camera" lens system arranged to cast an image on a different part of a stationary sensitised film or plate.

This proposal has certain disadvantages which are explained below and it is the object of the invention to overcome these disadvantages.

According to the present invention there is provided a cinecamera comprising a single image-forming optical system a group of plane reflecting surfaces spaced from the said system along the optical axis of the said system, grouped around such axis and inclined to such axis in non-parallel planes, a plurality of mountings for sensitised emulsion-carrying sheets each of such mountings being disposed so that a sheet mounted therein receives an image of an object field containing the said optical axis and disposed a predetermined distance from the said system each such image being formed by rays which have been reflected by a different one of the said reflecting surfaces and means for causing a plurality of light beams from the said object field to pass one at a time in succession to the said system and from the said system, after being focussed thereby, in the direction of the said group of reflecting surfaces along a plurality of paths such that each of such beams falls on a different one of the said reflecting surfaces and is reflected thereby so as to form an image on a sensitised sheet mounted in a different one of the said mountings.

According to the invention there is further provided a cinecamera comprising a single objective lens system, a group of plane reflecting surfaces spaced from the lens system along the optical axis of the lens system, grouped around such axis and inclined to such axis in non-parallel planes and a plurality of mountings for sensitised emulsion-carrying sheets each of such mountings being disposed so that a sensitised sheet mounted therein receives an image of an object field containing the said optical axis, located a predetermined distance from the said lens system and on the opposite side thereof from the said group of reflecting surfaces each such image being formed by rays which have been reflected by a different one of the said reflecting surfaces and means for causing a plurality of light beams from the said object field to pass in succession through the lens in the direction of the said group of reflecting surfaces along a plurality of paths such that each of such beams falls on a different one of the said reflecting surfaces and is reflected thereby so as to form an image on a sensitised sheet mounted in a different one of the said mountings.

The invention will be more readily understood from the following description relating to the accompanying drawings in which:

FIGURE 1 shows the previous proposal hereinbefore referred to;

FIGURE 2 shows a first embodiment of the invention;

These figures are of course in diagrammatic form.

The prior proposal hereinbefore referred to is shown in FIGURE 1 and comprises a plurality of spark or flash light sources $S_1$, $S_2$, $S_3$ . . . $S_n$ (not shown), a field lens, an arrow the ends of which define the limits of the field in passage through which the moving object may be photographed, and "camera" lens systems $L_1$, $L_2$, $L_3$ . . . $L_n$ (not shown). Rays emanating from $S_1$ are directed by the field lens to $L_1$, rays emanating from $S_2$ are directed to $L_2$, and so on for $S_3$ . . . $S_n$, and $L_3$ . . . $L_n$ respectively. Each of the camera lenses produces an image on one of the sensitised surfaces $I_1$, $I_2$, $I_3$ . . . $I_n$ (not shown) placed behind the lens. The light sources $S_1$, $S_2$, $S_3$ . . . $S_n$ are energised in turn in rapid succession during the time that the object to be photographed is moving in the field indicated by the arrow. Each light source causes the image of the field containing the object to appear on a different one of the surfaces $I_1$, $I_2$ etc. and the position of the object in relation to the field will be different in each case owing to the movement thereof in the field.

This system has the disadvantage of requiring a separate camera lens system for each separate "exposure" and this raises the particular difficulty in the case of microphotography, of accommodating the lens systems, which are in the form of microscope "objectives," sufficiently close together and sufficiently close to the field through which the photographed object moves.

FIGURE 2 shows one method of carrying out the present invention. A single objective is used and it can conveniently be a microscope objective of almost any focal length. Light from a small source at a position such as $S_1$ illuminates the object in transmission or silhouette, falls on the objective and is focussed to a real image of the source at a position just behind the objective. A small mirror placed at or near this focus can deflect the beam of light in any convenient direction. A real enlarged image of the object is formed at a position such as $I_1$. If the light source were moved to a position such as $S_2$ the real image of the source would be displaced and could be arranged to fall on a second small mirror which could deflect the beam of light so that the real image $I_2$ of the object is widely displaced from the position $I_1$. By moving the light source to other positions in the plane which contains $S_1$ and $S_2$ and is perpendicular to the axis of the system one can obtain in a similar way a series of other images $I_3$, $I_4$ . . . . The number of separate images can be equal to the number of facets on a small pyramidal reflector placed behind the microscopic objective.

Figure 3:
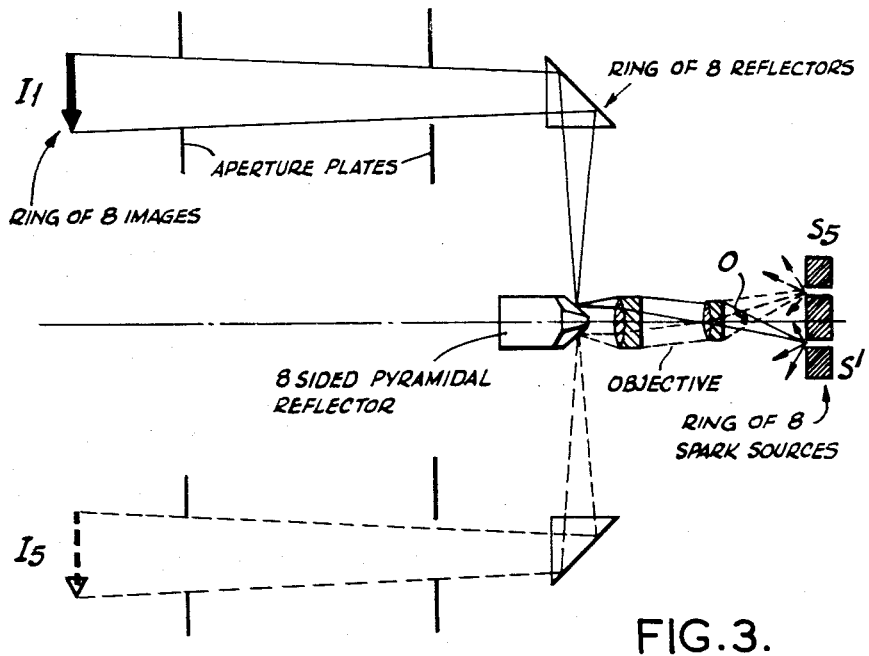
FIGURE 3 shows a second embodiment of the invention.

FIGURE 3 shows a more sophisticated arrangement of the embodiment shown in FIGURE 2. An 8-sided pyramidal reflector is used. A ring of 8 right angle prisms have been incorporated so that all the frames fall conveniently on a single photographic plate. It is an advantage to bloom the surfaces of these prisms to avoid faint cross reflections, or to use front surface mirrors.

The objective may be any of a number of lenses, for instance a 16 mm. N.A. 0.30 microscope objective, a 32 mm. N.A. 0.15 microscope objective; or alternatively a 1⅜" f 3.1 macro lens. The magnifications from object to image for the 16 mm. and 32 mm. objectives are 14½× and 7×. A ring of 8 projection eyepieces may be placed between the pyramidal reflector and the photographic plate to obtain larger magnifications but with the arrangement of FIGURE 3, with the images recorded directly all on one fine-grained plate, these individual images can be considerably enlarged before the limits of resolution become apparent.

The resolution with an optical system of this sort cannot be as high as if the illumination were arranged to make use of the whole of the aperture of the objective for each frame. However, the resolution is still adequate for many applications and depth of focus is considerably greater than that obtainable in the previous proposal of FIGURE 1. Test charts have been photographed and it is possible to distinguish 300 equally spaced black and white line pairs within the field of view for the 16 mm. objective and 260 for the 32 mm. objective. These figures may be compared with 500 and 600 obtained with a conventional photographic microscope.

Several kinds of light source could be used. The requirements are that the size of the source should be small and the specific brilliance high. The brightness of the spot on a cathode ray tube is sufficiently high to be a useful source in fast photography. A commercial type of cathode ray tube having a zinc sulphide phosphor, the emission of which falls to one-third of its peak value in approximately 3 microseconds has been successfully used and pictures of fair density were obtained when the grid of this tube was pulsed from cut-off to cathode potential for 30 microseconds. It is possible to use such a commercial cathode ray tube with a short persistance phosphor as the light source to take pictures with an exposure time of 33 microseconds. The advantage of this type of light source is that the one tube can be used to provide all the sources, that synchronisation with an event to be photographed is easy and that it is possible to vary the exposure time and inter-frame interval independently with little difficulty.

For shorter exposures a more intense source is desirable, and a spark source can conveniently be used. If open three-electrode gaps are used it is necessary to take precautions against early breakdown of any one of the gaps from ions produced by the discharge in another. A ring of 8 simple gaps has been successfully used, each in series with a thyratron and each supplied with current from a storage condenser of 0.1 microfarad charged to 3,000 volts. The peak current in a spark gap is about 400 amps. and the duration of the spark is about 1 microsecond. The thyratrons are fired successively by time delay circuits and control thyratrons in a well known circuit arrangement. The delay from the arrival of a synchronising or starting pulse to the peak of the first flash is of the order of a microsecond and the delay between successive flashes may be set independently at any convenient value from a microsecond to a millisecond (or longer).

A limitation of this arrangement is that it is not suitable for photography of self-luminous objects nor for photography of objects by reflected light. Even for the photography of objects by transmitted light there is a restriction in that objects which are strongly diffusing or refracting deflect some of the light so that it does not focus directly to an image of the source on a given facet of the pyramidal reflector and may fall on some other facet or facets of this reflector. Such rays give rise to faint ghost images. However in many cases in practice this ghosting is negligible.

The advantages of this arrangement are mainly that it is possible to obtain high quality pictures at high magnification and high framing rates. The system has no moving parts and is completely free from vibration. This is more important of course in micrography than in ordinary photography as small amplitude vibrations can easily lead to blurring on a much magnified scale. As only one objective is used the phenomenon is viewed for all frames from effectively the same aspect though the differences in the direction of the illumination do affect this a little.

Figure 4:
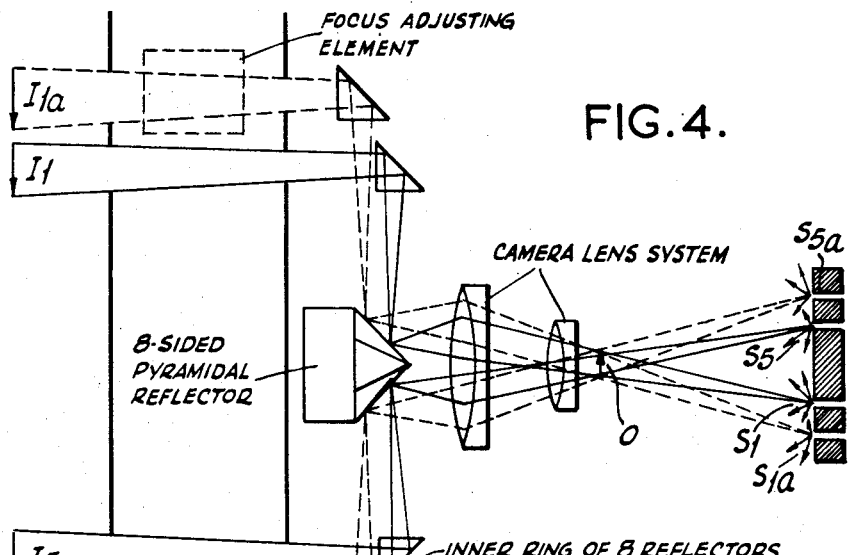
FIGURE 4 shows a modification of the embodiment shown in FIGURE 3.

FIGURE 4 shows a method of increasing the number of images which can be photographed without increasing the number of facets of the pyramidal reflector. Additional light sources are required of course. FIGURE 4 reproduces FIGURE 3 with added elements necessary for increasing the number of images in this way. To clarify the drawing the scale has been distorted by magnifying the size of the "camera" lens system and the pyramidal reflector in relation to the remaining parts of the apparatus which has the effect of reducing the magnification as compared with that which is attainable in practice.

The spark light sources $S_1 \ldots S_8$ are duplicated by an outer ring of similar spark light sources $S_{1a} \ldots S_{8a}$ so as to form two concentric rings of light sources. Corresponding light sources each disposed along the same radial line as one of the former light sources (e.g. $S_1$ and $S_{1a}$) produce images on different parts of the same facets respectively of the 8-sided pyramidal reflector. The light rays corresponding to these images diverge from one another and each is intercepted by a different one of two reflector members respectively of two concentric rings of reflectors similar to the single ring of reflectors shown in FIGURE 3.

These two rings of reflectors are of different diameters and in parallel planes slightly off-set from one another along the optical axis of the system so that light rays to be deflected by the reflectors of the outer ring escape interception by the reflectors of the inner ring.

Images $I_1$ and $I_{1a} \ldots I_8$ and $I_{8a}$ are formed on the one photographic plate as in the case of FIGURE 3 but there are twice as many of them and it is preferable to insert a piece of plane glass in the path of the light cones forming the outer ring of images, to bring them at focus on to the same plane as the inner ring of images.

The order in which the spark light sources are energised is unimportant.

A further arrangement according to the invention, which enables self-luminous objects and objects illuminated by reflected light to be photographed will now be described in relation to FIGURE 5.

A single microscope objective L is placed near to the object O to be viewed. A system of reflectors, which may conveniently be the plane facets of a pyramid P, similar to that shown in FIGURES 2 to 4, is placed close behind the objective. Between the objective and the pyramidal reflector is interposed a disc D and mounted for rotation about the axis XX. A slot or hole H in this disc allows light to pass through part of the objective and fall on one facet of the pyramid. The rays of light are reflected from this facet to a second mirror or prism $m_1$ and form a real image of the object at a position such as $I_1$. If the disc is rotated light will fall on some other facet and can form an image such as $I_2$ which can conveniently be on the same photographic plate as the first. In the simple case as many frames can be produced as there are facets on the pyramid.

For microscope objectives of focal lengths from 4 mm. to 40 mm. the diameter of the exit pupil may be between 6 mm. and 10 mm. and the pyramidal reflector may be 1 cm. across. With these dimensions the disc which effects the sequential recording need not be greater than 1 cm. in diameter. This means that it can be rotated at a high speed so that it is possible with the system to achieve a high framing rate.

The limit to the speed of rotation of the disc is set by its ability to withstand centrifugal stresses. The safe limiting peripheral speed can be equal to $$\sqrt{\frac{cf}{D}}$$

where $f$ is the maximum safe stress in the material, D is the density, and $c$ is a constant, normally between ½ and 1, depending on the shape of the disc and the position and shape of holes in it. Thus, for example, if the disc were made either of high tensile steel or of high strength aluminium alloy, it could run at a peripheral speed ≤400 m./sec. Such a disc, 1 cm. in diameter, would be safe up to speeds in excess of 10,000 revolutions per second. If the pyramidal reflector had, say, 16 facets and the disc had one slot the system could record 16 pictures at a rate of 160,000/sec.

The framing rate may be increased by having a plurality of equally spaced apertures in the disc so that all the facets of the pyramidal reflector are illuminated in $$\frac{1}{r}$$

of a revolution, where $r$ is the number of apertures, the framing rate being increased by the factor $r$. It is necessary, to avoid simultaneous exposures, that the number of facets of the pyramidal reflector shall not be integrally divisible by the number of apertures in the disc and that these two numbers have no common factor. Where the pyramidal reflector has 8 facets, for instance, there may be 3 or 5 apertures in the disc and the time between frames will then be decreased by a factor of 3 or 5 respectively.

It is necessary for the aperture to be narrow, specifically in the circumferential direction and it is preferably in the form of a slot or a round or square hole. This is particularly the case where a plurality of apertures is used. Such an aperture gives great depth of focus, at some sacrifice of picture quality as the width of the aperture is reduced, the ultimate limit to the narrowness of the aperture being set by the onset of diffraction effects.

There are numerous ways of mounting and rotating the disc. The highest speeds can be obtained by magnetic suspension and the application of a rotating magnetic field.

It is known to rotate steel balls in this way at a speed of 110,000 r.p.s. for a ball of 3/32 inch in diameter. A disc of four times this diameter can be rotated at approximately one-eighth of this speed.

However, much simpler means may be used at somewhat lower speeds, where the disc may be supported on an air bearing and driven by means of air jets. An even simpler method is to mount the disc within the inner race of a conventional ball bearing and to direct air jets obliquely at the balls and the ball cage. In a typical case a 3/8" ball race has been driven at 2,000 r.p.s. by a single jet of air from a hole of .062" in diameter supplied with air at 30 lb. per square inch.

Figure 6:
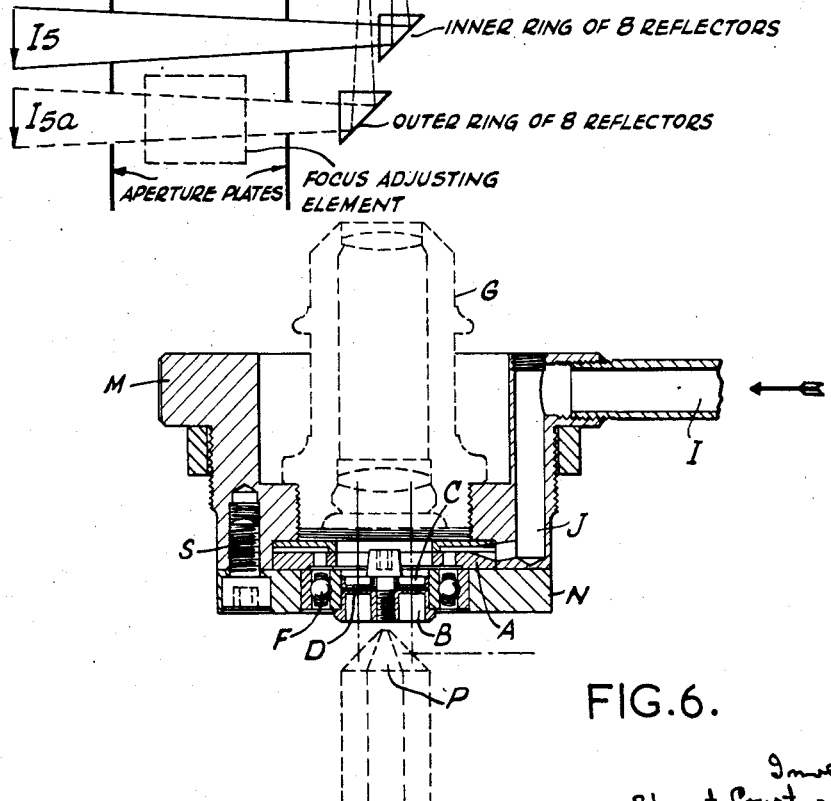
FIGURE 6 shows in more detail parts of the said third embodiment.

A practical arrangement of the latter type is shown in section in FIGURE 6.

A tubular casing M is flanged internally to form a mounting for the "camera" lens system G. An annular end plate N is secured to casing M by screws S, only one of which is shown.

A ball bearing F is a press fit within the central aperture of the end plate N and the disc D is secured in the central bore of the inner race of bearing F between a support B on one side of the disc and a clamping plate C on the other side of the disc. B is a press fit and C a sliding fit within the bore of the inner race of the ball bearing F and they are held together with the disc between them, by a central screw.

The disc has three similar slots disposed at equal intervals around a suitable pitch circle and the support B and clamping plate C each have two holes diametrically opposite to one another on like pitch circles. The holes in B and C are somewhat larger than the slot in disc E and are assembled with a hole in each of B and C exposing one of the slots in E. This provides a balanced rotor with only one of the slots of the disc exposed.

The pyramidal reflector P is shown in dotted lines to indicate its placing in relation to the disc in the complete equipment.

Air is introduced through an inlet pipe I and passes down ports J bored in the wall of the casing M, to the upper surface of a jet plate A secured in a seating in casing M above the ball bearing F. The jet plate has two diametrically opposite holes leading from its upper surface to the ball bearing. These holes are inclined at an angle of 30° to the plane of the plate and their pitch circle is such that air emerging from their lower end impinges obliquely on the balls and ball cage of bearing F which are carried around causing the inner race of the bearing to revolve.

This arrangement has given satisfactory results with an air supply at 50 lbs. per square inch and an air consumption of 2 to 3 cubic feet per minute.

At least one hundred runs may be expected of the ball bearing without any attempt to provide a continuous supply of lubricant and the ball bearing is inexpensive and quickly replaced when worn out. Speeds of 2,000 r.p.s. are readily achieved.

With this arrangement it is preferable to mount the pyramidal reflector H as close as possible to the "camera" lens system consistent with the provision of adequate space for the mounting of the rotor disc.

It is not necessary, as in the case of the arrangements illustrated in FIGURES 2 to 4, that the real image of any light source should fall on a facet of the pyramidal reflector, and this gives a wider choice of lens system than is the case with the arrangements of FIGURES 2 to 4. For instance it is possible to use standard microscope objectives of focal length from 4 mm. to 60 mm. Furthermore a long focus objective may be used to enable photographs to be taken with the instrument, of remote objects, though with a low effective numerical aperture. As an instance of this use of the instrument, a series of eight photographs has been taken at a framing rate of 12,000 per second of objects a few feet away from the instrument, using as a lens an achromat from a small telescope with a focal length of 9 inches.

The instrument illustrated in FIGURES 2 to 4 may of course be converted for the photography of self-luminous objects or objects illuminated by reflected light by mounting a rotating disc as described above in relation to FIGURES 5 and 6, between the "camera" lens and the pyramidal reflector. With this arrangement, however, the camera lens is spaced from the pyramidal reflector so as to produce a real image of light sources such as $S_1 \ldots S_n$ on the facets of the reflector. It is in general preferable to reduce this spacing as the useful field and the exposure parameters are thereby improved.

Figure 5:
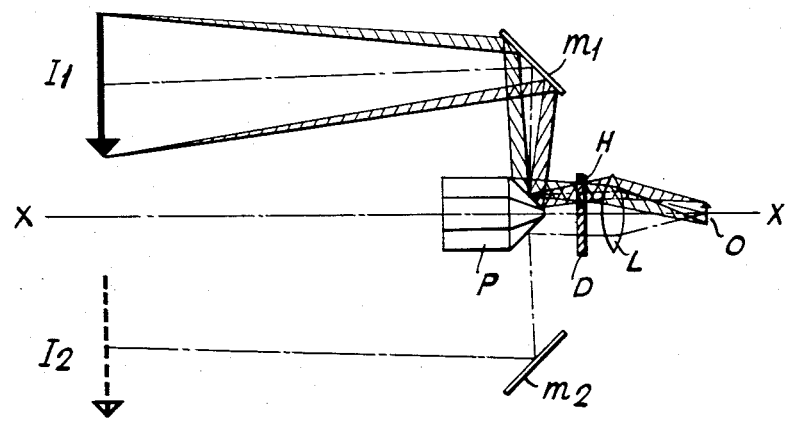
FIGURE 5 shows a third embodiment of the invention.

The image division arrangement shown in FIGURE 4 can readily be used with the revolving disc arrangement of FIGURES 5 and 6 by providing apertures at different distances from the centre of the disc which admit rays from the "camera" lens to different parts of each facet of the pyramidal reflector one part reflecting those rays to a reflector of the inner ring of reflectors and the other part reflecting those rays to a reflector of the outer ring of reflectors shown in FIGURE 4.

In the revolving disc arrangement of FIGURES 5 and 6 it is necessary to guard against fogging the photographic plate by repeated exposures. In the case of self-luminous objects there is generally little difficulty since the time during which the exposures are made is adjusted to the duration of the phenomenon to be photographed. Self-luminous phenomena of the type requiring the speed of which this apparatus is capable are generally in the nature of explosions, spark discharges and the like and it is not difficult to arrange that the photographing cycle is a little longer than the duration of the light caused by the phenomenon.

In the case of objects illuminated by a light source arrangements must be made to time the duration of the light given by the light source so that it does not exceed the duration of the photographing cycle. This may easily be arranged when electric discharge devices are used as light sources since the duration of the energising pulse can be accurately controlled by known electronic techniques and the same techniques enable the commencement of the light to coincide with the commencement of the phenomenon to be photographed.

Further image division may be obtained by colour differentiation methods, for instance two discrete images may be produced on two superimposed photographic plates separated by a filter with another filter placed in the path of one of two light sources of the spark type in the arrangement of FIGURES 2, 3 or 4, both light sources being arranged to produce an image on substantially the same part of the photographing plane.

Figure 7:
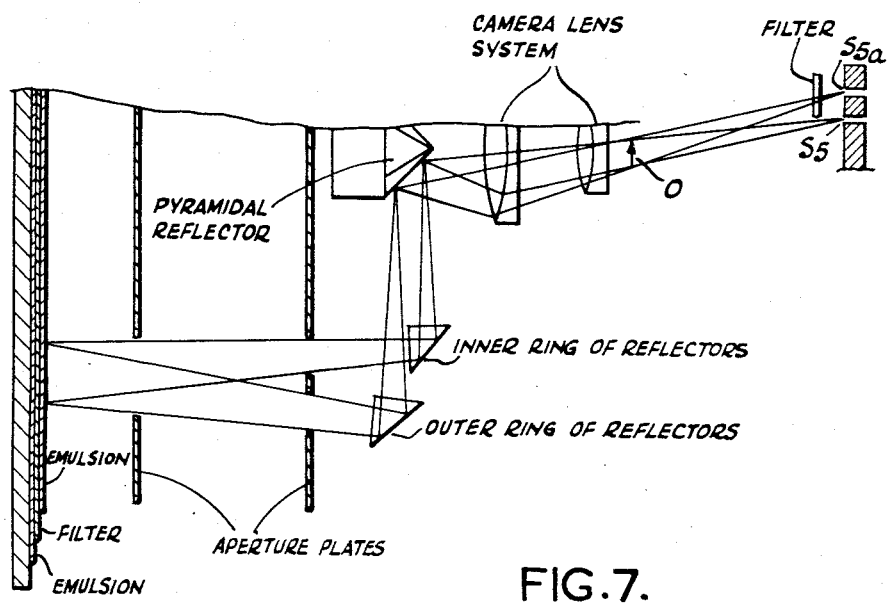
FIGURE 7 shows a fourth embodiment of the invention.

Such an arrangement is illustrated in FIGURE 7 which illustrates the arrangement of FIGURE 4 modified for use with such colour differentiation methods. Only one half of the equipment is shown for the sake of simplicity.

In a similar arrangement using the revolving disc of FIGURES 5 and 6 two apertures are provided in the disc, one containing a red filter and the other containing a blue filter, the apertures being on the same pitch circle and spaced apart by half the angular separation of the facets of the pyramidal reflector so that each image position on the photographic plate is exposed twice during a single revolution of the disc. Two photographic plates are placed one in front of the other with a red filter between them. Satisfactory definition is obtained with this arrangement and the interval between frames is halved and the number of exposures is doubled. More complicated systems of colour differentiation, using three or more colour bands may be used of course.

An alternative to the revolving shutter for opening the various light paths in succession is to place Kerr cells in their paths and to energise their electrodes in succession.

In a practical arrangement an annular multiple Kerr cell is made, having a single common central electrode and a ring of electrodes around the outside. The common electrode is connected to one terminal of the energising current supply and the electrodes of the outer ring are connected through commutating means to the other terminal of the said supply.

I claim:

A cinecamera comprising a single image forming optical system, a group of reflecting surfaces spaced from the optical system, grouped around and inclined in non-parallel planes to the optical axis of said optical system so that a plurality of light beams passing along a corresponding plurality of paths from an object field, containing the optical axis, to the optical system and from the optical system, after being focussed thereby, are reflected each by a different one of the reflecting surfaces outwards away from the said optical axis, a plurality of mountings for sensitized emulsion carrying sheets each mounted at a predetermined distance from the optical system, each said reflected beam falling on a sensitized sheet mounted on a different one of the said mountings and forming an image thereon, means for selecting each of the said paths one at a time in succession for the transmission of a light beam along the path so selected, said selecting means comprises an apertured shutter interposed between the said object field and the said group of reflecting surfaces and means for moving the said shutter so that the aperture lies in the path of and permits passage of the said beams one at a time in succession, said shutter is an opaque plate mounted for rotation about an axis substantially coincident with the said optical axis and normal to its major surfaces and having at least one aperture radially displaced from the rotational axis, said opaque plate mounted in the inner race of a ball bearing the outer race of which is held by a fixed mounting, and in which the means for moving the shutter comprises air jets adapted, when air is supplied thereto under pressure to direct a jet of air upon the balls of the ball bearing such jet having a component of direction which is tangential to the path taken by such balls on rotation of the inner race.

References Cited in the file of this patent

UNITED STATES PATENTS

| 2,086,182 | Dvornik | July 6, 1937 |
| 2,727,428 | Herman | Dec. 20, 1955 |

FOREIGN PATENTS

| 703,039 | Germany | Feb. 26, 1941 |
| 898,116 | Germany | Nov. 26, 1953 |